United States Patent
Radhakrishnan et al.

(10) Patent No.: US 7,738,876 B1
(45) Date of Patent: Jun. 15, 2010

(54) RADIO RESOURCE MANAGEMENT FOR WIRELESS LOCAL AREA NETWORKS

(75) Inventors: Ramesh Radhakrishnan, Saratoga, CA (US); Ramanathan Balachander, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 182 days.

(21) Appl. No.: 11/035,753

(22) Filed: Jan. 14, 2005

Related U.S. Application Data

(60) Provisional application No. 60/537,236, filed on Jan. 16, 2004.

(51) Int. Cl.
*H04W 72/04* (2009.01)
(52) U.S. Cl. .............. 455/450; 455/67.11; 370/338
(58) Field of Classification Search .......... 455/450, 455/434, 422.1, 69, 561, 67.11, 67.13; 370/338, 370/329
See application file for complete search history.

(56) References Cited

U.S. PATENT DOCUMENTS

| | | | |
|---|---|---|---|
| 5,717,688 A | 2/1998 | Belanger et al. | |
| 6,314,082 B1 | 11/2001 | Malmgren | |
| 6,393,482 B1 | 5/2002 | Rai et al. | |
| 6,522,881 B1 | 2/2003 | Feder et al. | |
| 6,985,465 B2 | 1/2006 | Cervello et al. | |
| 7,173,918 B2 | 2/2007 | Awater et al. | |
| 7,222,175 B2 | 5/2007 | Knauerhase et al. | |
| 7,509,129 B2 * | 3/2009 | Sinivaara | 455/453 |
| 2003/0139197 A1 | 7/2003 | Kostic et al. | |
| 2003/0231610 A1 * | 12/2003 | Haddad | 370/338 |
| 2004/0001467 A1 | 1/2004 | Cromer et al. | |
| 2004/0039817 A1 | 2/2004 | Lee et al. | |
| 2004/0047323 A1 | 3/2004 | Park et al. | |
| 2004/0165548 A1 | 8/2004 | Backes | |
| 2004/0223476 A1 | 11/2004 | Jose et al. | |
| 2004/0267928 A1 * | 12/2004 | Petrus | 709/225 |
| 2005/0071476 A1 | 3/2005 | Tejaswini et al. | |
| 2005/0090250 A1 * | 4/2005 | Backes | 455/434 |
| 2005/0124335 A1 * | 6/2005 | Cave et al. | 455/422.1 |
| 2005/0153702 A1 * | 7/2005 | Cuffaro et al. | 455/452.1 |

* cited by examiner

*Primary Examiner*—George Eng
*Assistant Examiner*—Khawar Iqbal
(74) *Attorney, Agent, or Firm*—Turocy & Watson, LLP

(57) ABSTRACT

Methods and systems are presented for establishing communications in a wireless local area network involving obtaining at least one channel-specific measurement for each of a plurality of frequency channels, automatically selecting one of the plurality of frequency channels as a selected frequency channel by taking into account the at least one channel-specific measurement for each of the plurality of frequency channels, configuring a present access point (AP) device to transmit and receive data on the selected frequency channel, and configuring a present station (STA) device to transmit and receive data on the selected frequency channel, wherein the present AP device and the present STA device are capable of communicating data within a wireless local area network.

26 Claims, 7 Drawing Sheets

US 7,738,876 B1

RADIO RESOURCE MANAGEMENT FOR WIRELESS LOCAL AREA NETWORKS

CROSS-REFERENCES TO RELATED APPLICATIONS

This application claims priority from U.S. Provisional Application No. 60/537,236; filed Jan. 16, 2004. The 60/537,236 application is incorporated herein by reference.

BACKGROUND OF THE INVENTION

As use of wireless local area networks (WLANs) increases, frequency channels over which wireless communications take place to support WLANs have become more and more overcrowded. A typical WLAN may involve one or more access point (AP) devices connected to a network and one or more client station (STA) devices connected to the network through an AP device. FIG. 1 depicts an illustrative wireless network 100. Wireless network 100 includes an AP device 102 communicating wirelessly with STA devices 104 and 106. Typically, wireless networks may include numerous AP devices and STA devices, but the simplified wireless network 100 is shown in here for illustrative purposes. AP device 102 is connected to a wired network 108 that may be connected other networks. Wireless network 100 operates by allowing STA devices 104 and 106 to access such other networks via AP device 102. A wireless network such as wireless network 100 may form a WLAN or a part of a WLAN.

In wireless network 100, AP device 102 communicates wirelessly with STA devices 104 and 106 using a particular frequency channel. This communication is possible as long as STA devices 104 and 106 stay within a certain radio signal range of AP device 102. The range defines a cell for AP device 102. There may exist other AP devices in wireless network 100 having their own respective cells, which can overlap with the cell of AP device 102. In its cell, another AP device may communicate with STA devices using a frequency channel that possibly overlaps the frequency channel used by AP device 102. In fact, two AP devices may use the exact same frequency channel. This may not cause any problems if the two AP devices operate in respective cells that are physically separated far from one another. In that case, even if they utilize the same frequency channel, the AP devices may not interfere with one another because they are beyond one another's radio signal range. However, if two AP devices operate in respective cells are close in proximity, interference is likely to occur.

With the use of WLANs becoming increasingly widespread, more and more AP devices are being deployed in closer proximity to one another. This significantly increases the likelihood of interference caused by neighboring AP devices operating on the same or similar frequency channels. Such interference can dramatically reduce the performance of WLAN networks by degrading the communication of data amongst affected AP devices and STA devices. Furthermore, the load of a wireless network can often be unevenly distributed. At any point in time, certain AP devices may be heavily loaded with communication of data with numerous STA devices, while other AP devices may be not heavily loaded at all. Such uneven distribution of load can lead to further degradation of the performance of a wireless network system.

Thus, there is an urgent need for improved techniques for wireless communications in increasingly crowded wireless network environments.

BRIEF SUMMARY OF THE INVENTION

The present invention relates to methods and systems for establishing communications in a wireless local area network involving obtaining at least one channel-specific measurement for each of a plurality of frequency channels, automatically selecting one of the plurality of frequency channels as a selected frequency channel by taking into account the at least one channel-specific measurement for each of the plurality of frequency channels, configuring a present access point (AP) device to transmit and receive data on the selected frequency channel, and configuring a present station (STA) device to transmit and receive data on the selected frequency channel, wherein the present AP device and the present STA device are capable of communicating data within a wireless local area network.

The at least one channel-specific measurement for each frequency channel may comprise a measurement of signal strength on the frequency channel. The measurement of signal strength may be based on a received signal strength indicator (RSSI) measurement. The measurement of signal strength may be based on a signal-to-interference ration (SIR) measurement. The measurement of signal strength may be based on a measure of general signal strength on the frequency channel. The measurement of signal strength may be based on a measure of signal strength associated with a specific AP device operating on the frequency channel. In one embodiment of the invention, the measure of signal strength associated with a specific AP device is obtained by sending a probe request to the specific AP device and measuring signal strength on the frequency channel as the specific AP device sends a probe response corresponding to the probe request.

The at least one channel-specific measurement for each frequency channel may comprise a measurement of data load on the frequency channel. The measurement of data load may be based on a percentage of time during which an AP device is communicating data on the frequency channel. In one embodiment of the invention, the at least one channel-specific measurement for each frequency channel comprises a composite measure that takes into account, for each of a plurality of AP devices operating on the frequency channel, a measurement of signal strength associated with the AP device and a measurement of data load associated with the AP device.

Automatic selection of one of the plurality of frequency channels may be triggered during initialization of the wireless local area network, during expansion of the wireless local area network, and/or during operation of the wireless local area network, when a predetermined condition is met. Periodic evaluation of whether the predetermined condition is met may also be performed. The predetermined condition may be met if a packet error rate (PER) associated with the present AP device exceeds a threshold.

Automatically selection of one of the plurality of frequency channels may be performed by the present AP device. Automatic selection of one of the plurality of frequency channels may be triggered by a central entity. In one embodiment, the central entity receives information related to the at least one channel-specific measurement from each of a plurality of AP devices and selects at least one of the plurality of AP devices to perform automatic selection of one of the plurality of frequency channels.

In one embodiment, automatic selection of one of the plurality of frequency channels may involve, from the plurality of frequency channels, identifying one or more least populated frequency channels, wherein a fewest number of AP devices operates on each of the least populated frequency channels, and selecting one of the least populated frequency channels as the selected frequency channel, wherein a closest AP device operating on the selected frequency channel is farther from the present AP device than a closest AP device operating on any other least populated frequency channel.

DETAILED DESCRIPTION OF THE INVENTION

I. Dynamic Frequency Selection

Figure 1:
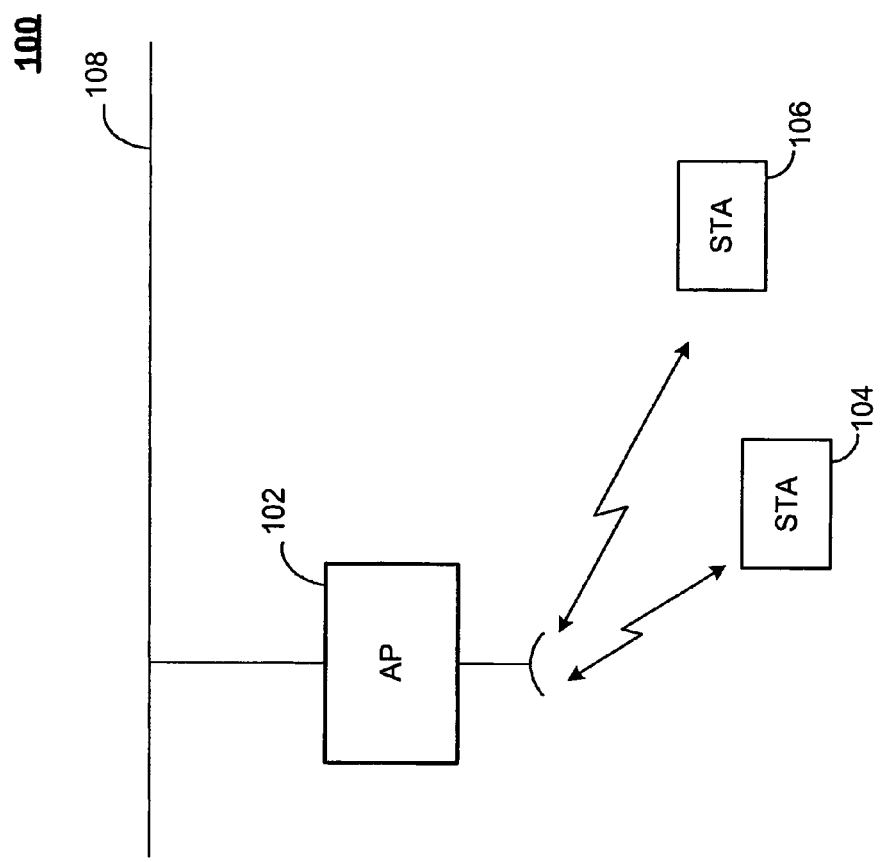
FIG. 1 depicts an illustrative wireless network.
Figure 2:
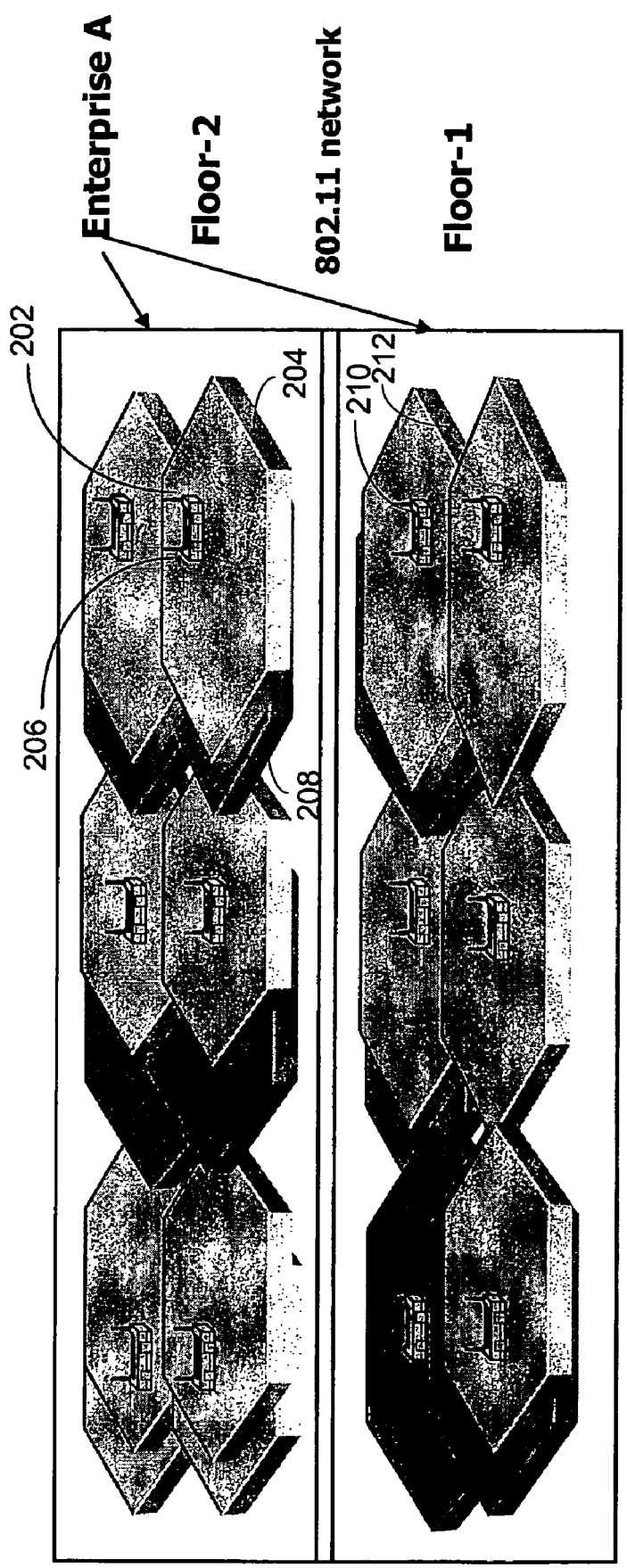
FIG. 2 depicts an illustrative scenario of planned wireless network development and growth.

FIG. 2 depicts an illustrative scenario of planned wireless network development and growth. Here, a single tenant referred to as Enterprise A occupies multiple floors of an office building. On each floor, multiple AP devices may be deployed to implement one or more wireless local area networks. Here, an AP device refers broadly to a device that is capable providing network access to one or more station (STA) devices in a wireless local area network. An AP device may be implemented using a combination of hardware and/or software. AP devices are not necessarily restricted to one or more physical modules. For example, there may be multiple AP devices contained in a single physical module. As it is known in the art, often a physical module commonly referred to as an "access point" may actually include two or more separate radio communication units, each capable of communicating on a different radio frequency channel. It should be understood that an AP devices as presently described may comprise such a radio communication unit.

As shown in FIG. 2, the AP devices of the two floors form a single 802.11 wireless local area network. Each AP device may have its own corresponding cell. For example, an AP device 202 having a corresponding cell 204 is deployed on the second floor. AP device 202 may be included in a common physical module as another AP device 206, which has a corresponding cell 208. Even though the physical module in this case houses two separate AP devices 202 and 206, the module may sometimes be referred to as an AP. As shown in FIG. 2, AP devices may be deployed in close proximity to one another within the building. Thus, AP devices on the same floor or on different floors have the potential of interfering with one another. For example, a AP device 210 deployed on the first floor and having a corresponding cell 212 may interfere with AP device 202.

Such interference may be avoided by Enterprise A through careful planning of the wireless network environment. Enterprise A may configure AP devices that are deployed in close proximity to one another such that they operate on separate frequency channels to avoid interference, even for AP devices deployed on different floors. For instance, Enterprise A may configure AP device 202 to operate on one frequency channel, and AP device 210 to operate on another frequency channel, such that they do not interfere with one another. However, planning of the wireless network environment is not always feasible, as described in more detail below.

Figure 3:
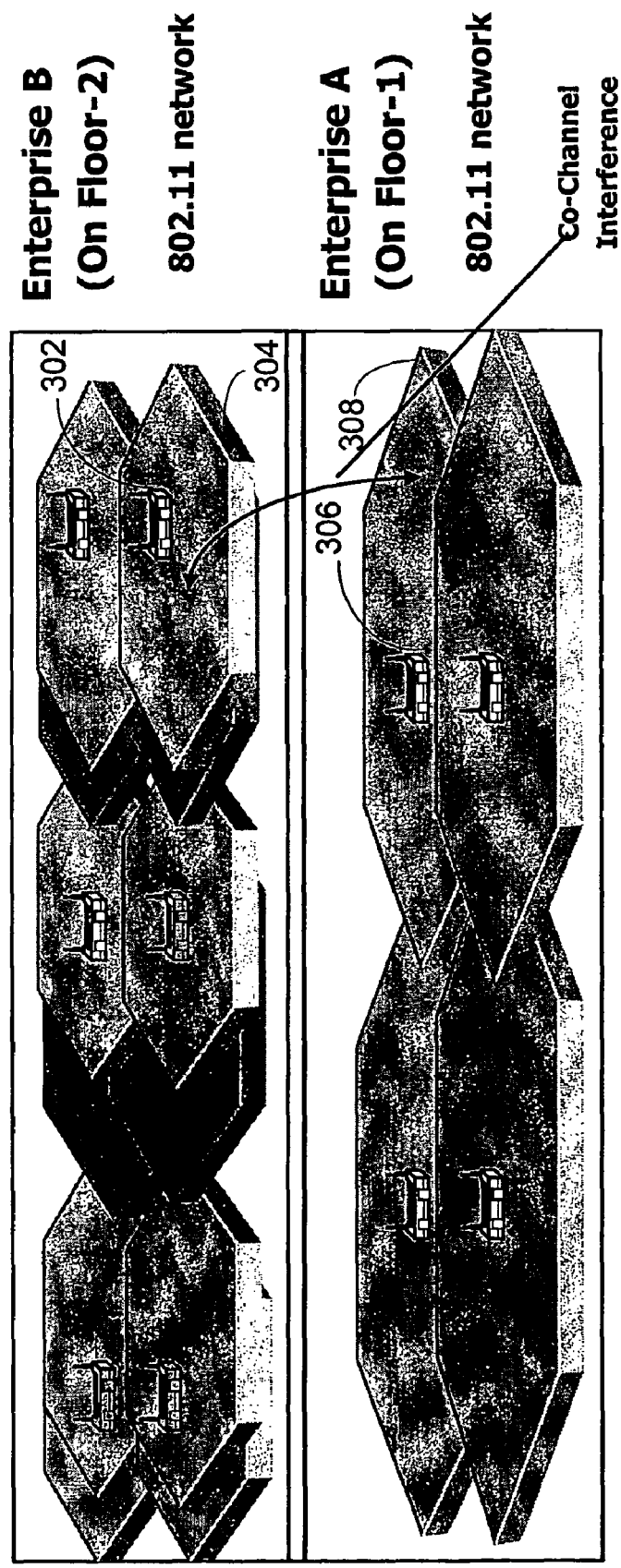
FIG. 3 depicts an illustrative scenario of limited planning or unplanned wireless network development and growth.

FIG. 3 depicts an illustrative scenario of limited planning or unplanned wireless network development and growth. Here, multiple tenants referred to as Enterprise A and Enterprise B occupy floors one and two, respectively, of an office building. On each floor, multiple AP devices each with a corresponding cell may be deployed to implement one or more wireless local area networks. As shown, the AP devices of each floor forms a separate 802.11 wireless local area network. In this case, planning of the wireless network environment may not be feasible. Enterprise A and Enterprise B may be independent entities, such as separate corporations, that have no interaction with one another. In fact, coordinated deployment of AP devices across the two floors may be impossible or even undesirable, for various reasons such as concerns relating to network privacy and security.

Thus, AP devices deployed on the first and second floors may interfere with one another, if they happen to operate on the same or closely located frequency channels. For example, an AP device 302 on the second floor and having a corresponding cell 304 may interfere with an AP device 306 on the first floor and having a corresponding cell 308. This may occur, for instance, if Enterprise A configures AP device 306 to operate on a particular frequency channel, and Enterprise B happens to configure AP device 302 to operate on the same frequency channel. Without coordination between Enterprise A and Enterprise B on the deployment of their AP devices, such co-channel interference may occur, especially as wireless networks become more commonly used.

Figure 4:
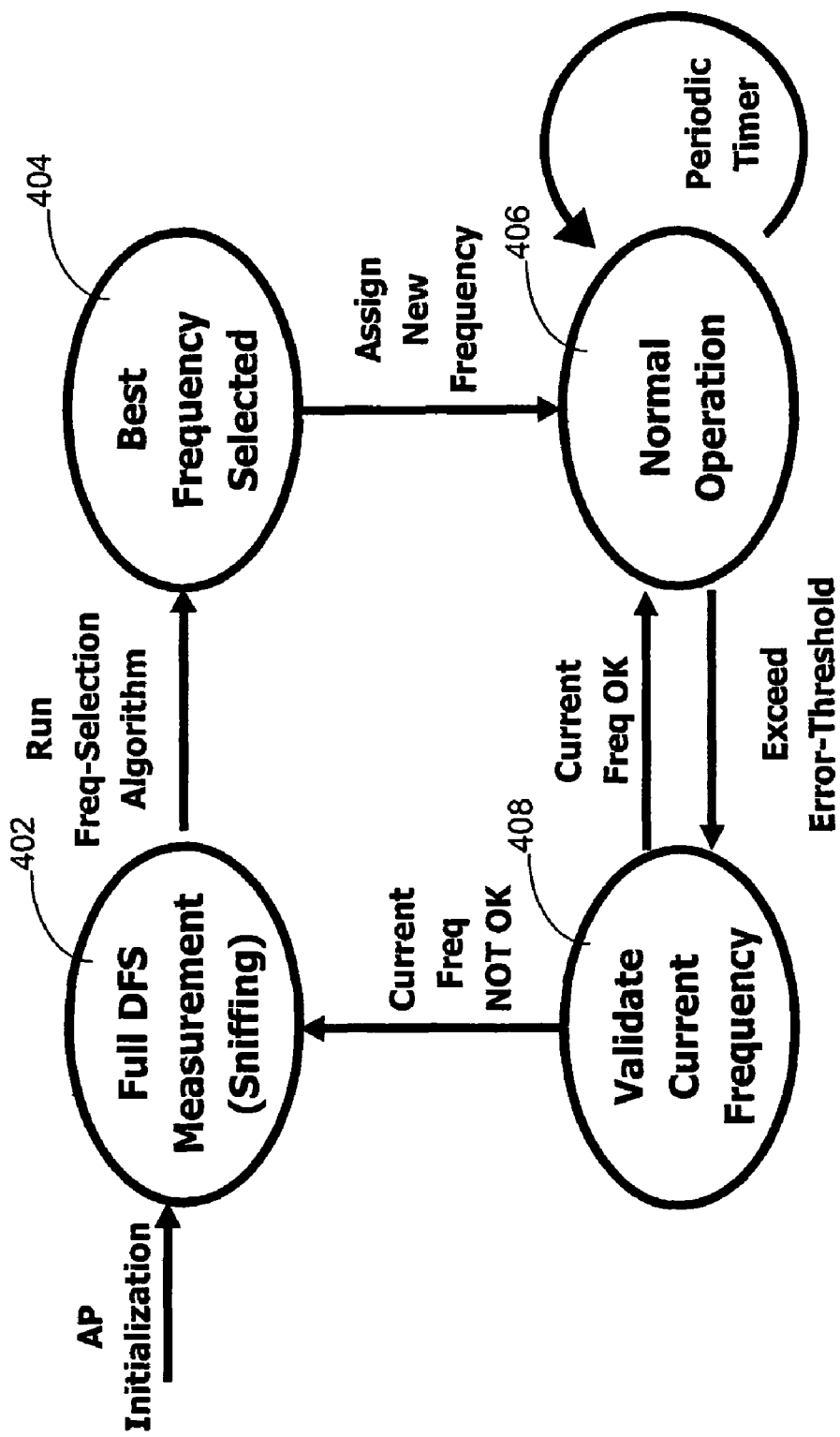
FIG. 4 is a state diagram of a process for allowing an AP device to dynamically select a frequency channel in accordance with one embodiment of the present invention.

FIG. 4 is a state diagram of a process for allowing an AP device to dynamically select a frequency channel in accordance with one embodiment of the present invention. Instead of being fixed to a particular frequency channel, the AP device may dynamically select a particular frequency channel on which to operate. This dynamic frequency channel selection may take place during initialization of a wireless network, during expansion of the wireless network, or during normal operation.

In a state 402, at least one channel-specific measurement is obtained for each of a plurality of frequency channels. State 402 may be entered, for instance, upon initialization of a wireless network. As shown in the figure, the one or more measurements obtained at state 402 may be referred to as a full dynamic frequency selection (DFS) measurement, or "sniffing." Generally speaking, the available frequency spectrum is evaluated to provide information for facilitating the selection of a particular frequency channel.

Different types of measurements may be obtained for each frequency channel. For example, different measurements relating to signal strength may be obtained. One such measurement may be a received signal strength indicator (RSSI) measurement taken on a frequency channel by the AP device. The RSSI measurement may provide a general measure of signals strength present on the particular channel. Another measurement related to signal strength may be a signal-to-interferer ration (SIR) measurement taken on the frequency channel by the AP device. The SIR measurement may provide an indication of the relative strength of a desired signal compared to that of interference present on the frequency channel.

One or more of such different types of measurements may be used in selecting an appropriate frequency channel on which the AP device is to operate.

According to one embodiment of the invention, a measurement related to signal strength may be measured generally for a frequency channel. Alternatively or additionally, such a measurement may be obtained with respect to a particular signal source in the frequency channel. For example, an original AP device may send a probe request on a frequency channel, directed at other AP devices operating in the vicinity. Any AP device that receive the probe request may then respond by sending a probe response on the frequency channel. There could be multiple AP devices that send such probe responses. The original AP device can thus measure the RSSI value of each probe response while receiving the probe response. This provides a more detailed measurement of signals present on the frequency channel.

Furthermore, STA devices associated with an AP device may also make measurements related to signal strength on the frequency channel. Such STA devices may then communicate the measurements to the AP device. The AP device may use measurements it obtains on its own and/or measurements obtained by its associated STA devices in selecting a frequency channel.

A state 404 may follow state 402. In state 404, a particular frequency channel is selected, taking into account the measurements obtained in state 402. In the present embodiment, the frequency channel having the least amount of signal occupancy may be chosen as the selected frequency channel. There may be various ways in which the obtained measurements may be utilized in making the frequency selection. In one example, the frequency channel having the lowest RSSI measurements and/or highest SIR ratios is selected. Different combinations of such measurements may also be utilized to select a frequency channel in accordance with the invention.

A state 406 may follow state 404. In state 406, AP device conducts normal operations using the selected frequency channel. This may include communication of data on the selected frequency channel with different STA devices associated with the AP device. During such operations, a predetermined condition may be periodically monitored to decide if the AP device needs to exit state 406 to possibly select a new frequency channel. The rate at which the predetermined condition is checked may be varied depending on the implementation and environmental factors. In one example, the predetermined condition is checked once every ten minutes.

The predetermined condition may be based on different types of information. In one embodiment, one or more packet error rates (PER) may be used to define the condition. Such PER values may be measured by the AP device or one or more of the STA devices communicating with the AP device on the current frequency channel. If multiple PER values are measured, a composite PER value may be calculated and used in as a single PER value when evaluating the condition. For example, if the PER value exceeds 1%, the AP device may exit state 404 and proceed to state 406. In another embodiment, one or more signal strength measurements may be used to define the condition. For example, if an SIR value measured at the AP device exceeds a maximum threshold, the AP device may exit state 404 and proceed to state 406. In other embodiments, another factor or a combination of factors may be used to define the predetermined condition.

A state 408 may follow state 406. In state 408, the AP device may determine whether the current frequency channel it is using is suitable for continued operation. Such an determination may involve evaluating various measurements discussed previously. For example, if an SIR measurement on the channel is found to be below a particular value, the process may exit state 408 and proceed to state 402. Otherwise, the process may return to state 406. In this manner, state 408 provides a secondary verification before the AP device proceeds to select a new frequency channel. In an alternative embodiment of the present invention, step 408 may be skipped, and the process may proceed immediately to state 402 upon exiting state 406.

A. Use of Thresholds on Measurements

In one embodiment of the invention, various thresholds defined with respect to measurements may be used in the frequency selection process employed in state 404 of FIG. 4. Use of thresholds on RSSI measurements are described below for illustrative purposes. It should be understood that thresholds may also be implemented with respect to other types of measurements. According to the present embodiment, a maximum RSSI threshold may be defined as a carrier sense threshold. Typically, a device that receives a signal having a signal strength above the carrier sense threshold on a particular channel would determine that the channel is already occupied and thus would defer to the existing signal and not transmit its own signal. According to the present embodiment, a minimum RSSI threshold may be defined as a carrier detection threshold. Typically, a device that receives a signal having a signals strength below the carrier detection threshold on a channel would determine that the signal is not strong enough to be properly received and thus would ignore the signal. Carrier sense and carrier detection thresholds may be set at different values for an AP device depending on the deployment environment. For example, factors such as open space versus divided rooms and dense versus sparse layout can affect these settings, as is known in the art.

Thresholds such as a maximum and minimum RSSI thresholds may be used to efficiently conduct dynamic frequency selection. For instance, an AP device detecting a signal strength on a particular channel that exceeds the maximum RSSI threshold may remove that frequency channel from a list of possible channels to select. Instead, the AP device may select from frequency channels that do not have measurements exceeding the maximum RSSI value. Such a procedure may allow the AP device to reduce the number of candidate channels and thereby more efficiently select a particular channel.

In this example, a situation could arise in which all of the available frequency channels have signal strength measurements that exceed the maximum RSSI threshold. In such a case, according to the present embodiment of the invention, the AP device may reset the maximum RSSI value to a higher value to proceed with the channel selection process. If again all available frequency channels have signal strength measurements that exceed the maximum RSSI threshold, the threshold may be raised again. If after multiple iterations it is determined that that continuing to increase the threshold does lead to proper selection of a suitable frequency channel, the AP device may select a default frequency channel or a frequency channel on which it is presently communicating data.

B. Load Based Dynamic Frequency Selection

According to one embodiment of the present invention, the at least one channel-specific measurement obtained in state 402 shown in FIG. 4 may comprise a measurement of data load on the frequency channel. Often, a frequency channel that is a candidate in the channel selection process may already be occupied by devices communicating data. The amount of communication taking place, or load, on such a channel may inform the channel selection process. Generally speaking, it may be advantageous to avoid a channel that is already heavily loaded and instead choose a less heavily loaded channel.

Figure 5A:
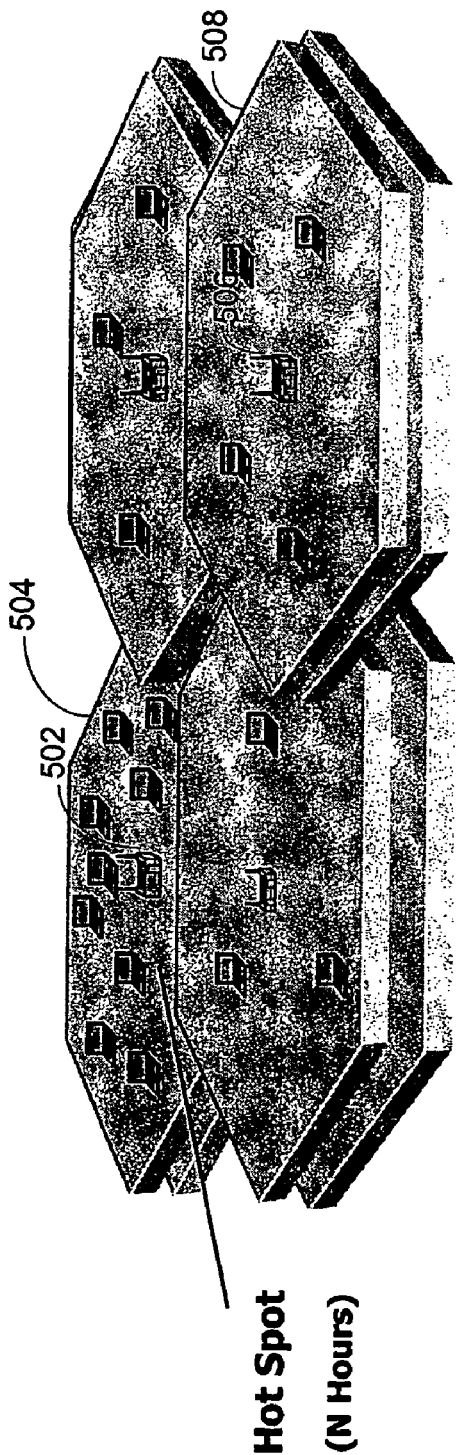
FIG. 5A shows a wireless network as it exists at a particular time referred to as "N hours"
Figure 5B:
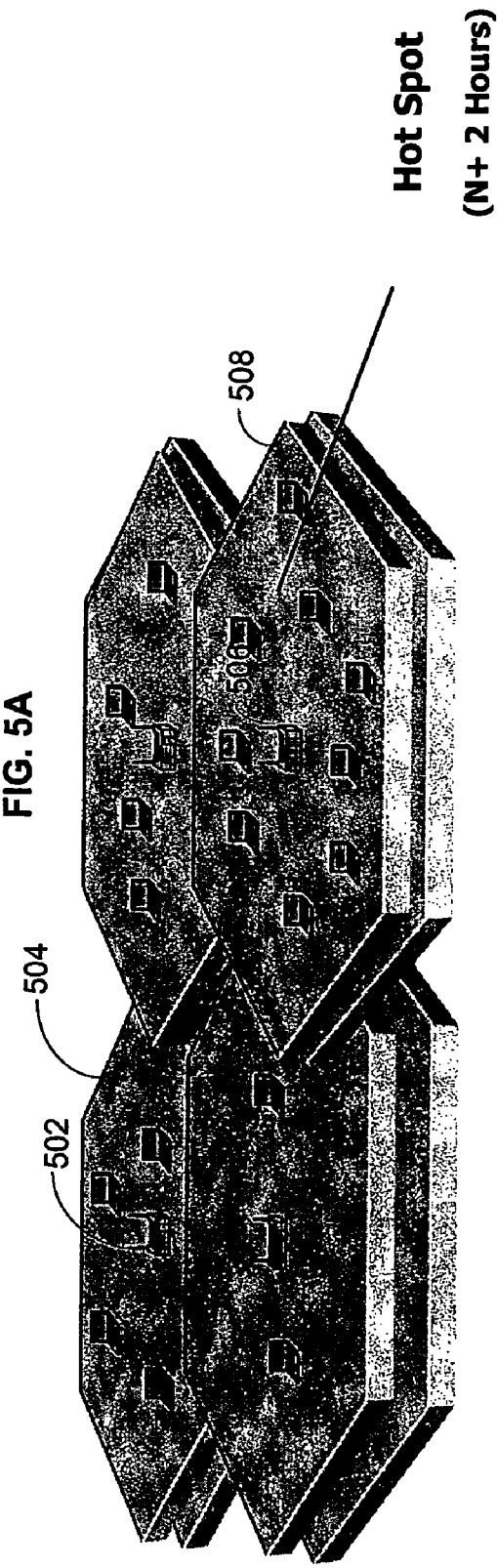
FIG. 5B shows the same wireless network as it exists at a later time referred to as "N+2 hours"

FIGS. 5A and 5B illustrate what may be referred to as a "dynamic hotspot problem." FIG. 5A shows a wireless network as it exists at a particular time referred to as "N hours." As shown, the wireless network comprises a number of AP devices and corresponding cells. These include AP device 502 and its corresponding cell 504, as well as AP device 506 and its corresponding cell 508. At "N hours," there exists a concentration of STA devices in the vicinity of cell 504. This general location is thus referred to as the current hot spot in the wireless network. FIG. 5B shows the same wireless network as it exists at a later time referred to as "N+2 hours." The wireless network still includes the same AP devices and corresponding cells. However, at "N+2 hours," there is no longer a concentration of STA devices in the vicinity of cell 504. Now, it is cell 508 that is crowded with a concentration of STA devices and has become the current hot spot.

As shown in FIGS. 5A and 5B, the load condition of a particular channel on which an AP is operating may change dramatically with time. For instance, at "N hours," the frequency channel on which AP device 502 is operating is heavily loaded. However, at "N+2 hours," the same frequency channel on which AP device 502 is operating is no longer heavily loaded. Generally speaking, the more heavily loaded a frequency channel, the less capable it can be in taking on additional signal transmissions.

In one embodiment of the invention, the frequency selection process takes into account not only signal strength measurements such as RSSI and SIR, but also the load of neighboring AP devices using the same frequency channel. Thus, in a hotspot situation where a particular AP device is experiencing significantly high loads, neighbor AP devices may avoid the frequency channel used by the heavily loaded AP device. The load of a frequency channel may be used in choosing a new frequency channel (such as in state 404 in FIG. 4) and/or in triggering a frequency selection process (such as in state 406 in FIG. 4).

Use of load of a frequency channel in the frequency selection process promotes even distribution of load across available frequency channels. This improves performance by decreasing degradation caused by interference and increasing system throughput.

C. Channel Quality Factor

According to one embodiment of the invention, a combination of signal strength measurements and data load measurements are used in the frequency channel selection process. A composite factor referred to here as a "channel quality factor" is computed for each candidate frequency channel. The frequency channel having the best "channel quality factor" is then chosen in the frequency channel selection process.

The channel quality factor may be defined as follows. The contribution ($CQ_{f1,AP1}$) of a particular AP device (AP1) to the channel quality factor on a particular frequency channel (f1) is defined according to the equation:

$$CQ_{f1,AP1} = \text{Proximity Factor} * \text{Load Factor}$$

The proximity factor may range from 0% to 100% and may be based on a signal strength measurement such as an RSSI measurement obtained with respect to a particular AP device. Such an RSSI measurement may be obtained by measuring probe response signal from the particular AP device, as mentioned previously. For example, the proximity factor may be defined based on the RSSI measurement as follows. The proximity factor is defined at 100% if the RSSI value is greater than or equal to the carrier sense threshold. The proximity factor is reduced by 10 percent for every 1 dbm the RSSI value falls below the carrier sense threshold. The proximity factor reaches 0% when the RSSI value falls 10 dbm below the carrier sense threshold. An AP device collecting measurements in order to select a frequency channel may measure RSSI values associated with neighboring AP devices by sending a probe request signal. The AP device may then receive and measure the probe response signal sent from each neighboring AP device.

The load factor may be expressed as a percentage (%) of total time that a particular AP device spends in communicating data. This may be the aggregate time of burst periods, expressed as a percentage (%) of total time. The load factor of an AP may be averaged over a specified duration, such as 30 minutes. An AP device collecting measurements in order to select a frequency channel may receive reports of load factors from neighboring AP devices. Such a report may be received periodically over a protocol such as an inter-access point protocol (IAPP). Alternatively, the report may be received as part of a probe response, which is mentioned previously.

The channel quality of a particular frequency channel ($CQ_{f1}$) may be determined by combining the contributions of AP devices operating on the frequency channel, according the equation:

$$CQ_{f1} = CQ_{f1,AP1} + CQ_{f1,AP2} + CQ_{f1,AP3} \ldots$$

In other words, the channel quality of a frequency channel f1 may be the weighted sum of all individual load factors for frequency channel f1, weighted according to their respective proximity factors. This channel quality factor may then be computed for each candidate frequency channel. Finally, the frequency channel having the lowest value for its channel quality factor may be selected in the frequency channel selection process.

D. Triggers for Dynamic Frequency Selection

Referring back to FIG. 4, dynamic frequency channel selection as depicted in this figure may take place during initialization of a wireless network, during expansion of the wireless network, or during normal operation. Initialization of a wireless network may occur upon initial deployment or upon network recovery after some sort of failure. An AP device deployed in a wireless network may perform dynamic frequency channel selection during initialization of the wireless network, as shown at state 402. Expansion of the wireless network may involve the addition of a new AP device into the network. Such a new AP device may perform dynamic frequency channel selection as it is being brought into the wireless network. Further, an AP device already operating in a wireless network may proceed toward a process of dynamic frequency channel selection upon detection of some predetermined condition, as shown in state 406.

Although an AP device may carry out the process illustrated in FIG. 4 for automatically selecting a frequency channel, various entities may trigger such a process. According to one embodiment, an AP device itself may trigger the process of frequency selection. For example, the AP device operating in state 406 in FIG. 4 may detect a predetermined condition and proceed toward other states for selecting a new frequency channel.

According to another embodiment, a central entity may trigger the frequency selection process. The central entity may gather information relating to data load as reported from a number of AP devices. Just as an example, each AP device may inform the central entity whenever its data load surpasses a particular threshold, such as 75%. Having received this information, the central entity may trigger neighboring AP devices operating in the same frequency to perform dynamic frequency selection and choose a better frequency if possible. In this manner, the central entity can coordinate the triggering of dynamic frequency selection by multiple AP devices operating close to one another and on the same frequency channel. This coordination may help to avoid race conditions in which numerous AP devices all proceed at the same time to select new frequency channels on which to operate.

Furthermore, the frequency selection process may be triggered based on different types of measurements. For example, the process may be triggered based on measurements of packet error rate (PER), RSSI, SIR, and/or data load, as mentioned previously.

E. Enhanced Implementation of Dynamic Frequency Selection (Furthest-Closest)

According to another embodiment of the invention, the dynamic frequency channel selection takes into account a measure of number of AP devices operating on each available frequency channel. The frequency channel having the least number of AP devices operating thereon may be selected. If more than one frequency channel satisfy this criterion, then additional factors may be considered to select one frequency channel.

Figure 6:
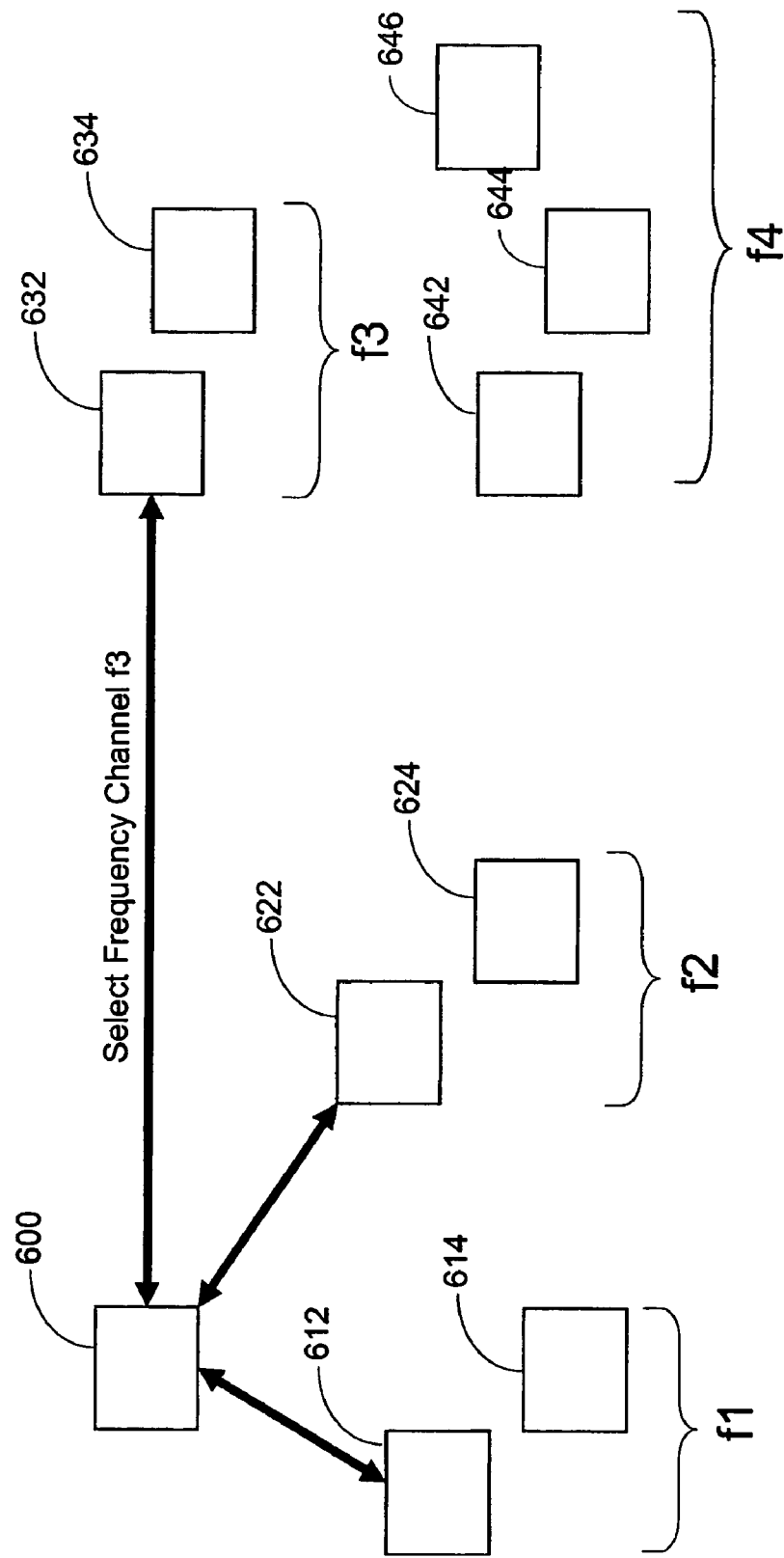
FIG. 6 illustrates the selection of a frequency channel from four possible frequency channels.

FIG. 6 illustrates the selection of a frequency channel from four possible frequency channels. Here, an AP device 600 is in the process of selecting a frequency channel on which it is to operate. The four frequency channels available are referred to as f1, f2, f3, and f4. Two AP devices 612 and 612 are operating on frequency channel f1. Two AP devices 622 and 622 are operating on frequency channel f2. Two AP devices 632 and 632 are operating on frequency channel f3. Three AP devices 642 and 642 are operating on frequency channel f4. FIG. 6 also depicts the proximity of these AP devices in relation to AP device 600.

First, AP device 600 determines if a particular frequency channel has the fewest number of AP devices operating on it. If so, that channel is selected as the frequency channel on which AP device 600 will operate. Here, the fewest number of AP devices operating on any frequency channel is two. However, three different frequency channels, f1, f2, and f3, satisfy this criterion. Thus, the selection of a frequency channel is not complete at this point. Instead, f1, f2 and f3 are identified as least populated frequency channels, and one of these channels will be chosen as the selected channel. Frequency channel f4 is not a least populated channel and is no longer considered a candidate.

One of the least populated frequency channels is selected such that the closest AP device operating on the selected frequency channel is farther than the closest AP device operating on any other least populated frequency channel. For example, for each of the least populated frequency channels f1, f2, and f3, the AP device on the channel that is closest in proximity to AP device 600 is identified. On frequency channel f1, the closest device is AP device 612. On frequency channel 12, the closest device is AP device 622. On frequency channel 13, the closest device is AP device 632. Now, it is determined which of the closest devices 612, 622, and 632 is farthest away from AP device 600. As shown in FIG. 6, AP device 632 is farthest away. Thus, frequency channel 13 is chosen as the selected frequency channel on which AP device 600 is to operate.

There may be various ways to measure the proximity of various AP devices to AP device 600. For example, the proximity factor based on a measure of signal strength, as described previously, may be used. Other measures indicating proximity of devices may also be used.

F. Clear AP-STA Communication

Various messages may be passed between AP devices and STA devices to facilitate the process of dynamic frequency selection. For example, an AP device that requests a report of measurement information from an STA device may send a measurement request to the STA device. Such a request may specify a channel list identifying channels on which to make measurements, a time by which to complete a measurement, and/or other data. As another example, an STA device may respond by sending a measurement response to the AP device. Such a response may specify a measured RSSI value for each frequency channel requested, for instance. As a further example, an AP device that has selected a new frequency channel on which to operate may inform its associated STA devices, so that they can also transition to operation on the new frequency channel. Such a message may be sent as a beacon from the AP device to numerous STA devices. According to one embodiment of the invention, these and other messages passed between AP devices and STA devices may be implemented using messages defined in an 802.11(h) protocol. Variations on such a protocol or other protocols may also be used.

In certain situations, a portion of the STA devices associated with an AP device may not have sufficient capability to dynamically transition to a newly selected frequency channel. According to one embodiment of the present invention, in such a case, a common physical module including two separate AP devices may be used to partition the STA devices into two groups: one group capable of dynamically transitioning to a new frequency, and one group not capable of doing the same. One AP device in the physical module may be then be associated with STA devices in the first group. This AP device may proceed with dynamic frequency selection, communicating with its STA devices on dynamically selected frequency channels. The other AP device in the physical module may then be associated with STA devices in the second group. This other AP device may operate on a static, pre-selected frequency channel with its STA devices. In this manner, dynamic frequency selection may be implemented to flexibly accommodate differently capable STA devices.

II. Load Balancing

In one embodiment of the present invention, improved load distribution in a wireless network may be achieved by selecting the AP device with which an STA device associates, taking into account load information. If there exist a number of AP devices with which an STA device can associate, an AP device having a relatively light load may be selected. The load of a particular AP device may be measured in different ways, as discussed in later sections. For example, the number of STA devices already associated with the AP device, the amount of channel utilization such as percentage of time the AP device is communicating data, and/or a combination of these and other factors may be used in measuring load.

Figure 7:
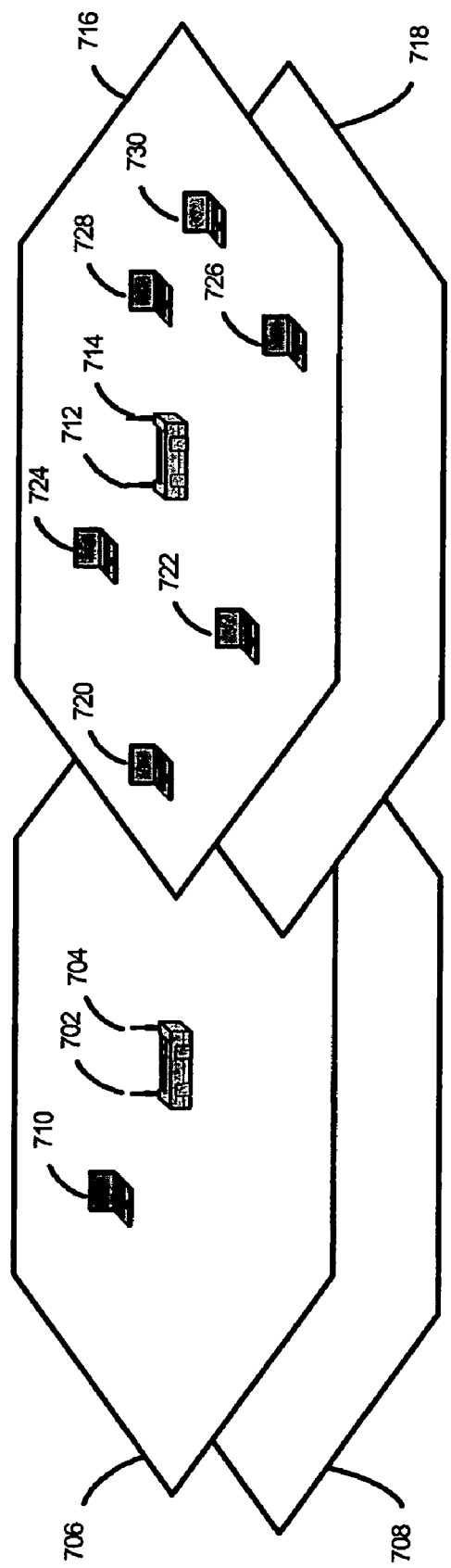
FIG. 7 shows a wireless network exhibiting uneven load.

FIG. 7 shows a wireless network exhibiting uneven load. The wireless network includes AP device 702 and 704, having cells 706 and 708, respectively. Here, AP devices 702 and 704 are shown as being included in a common physical module. An STA device 710 is within cells 706 and 708. Wireless network also includes AP devices 712 and 714, having cells 716 and 718, respectively. AP devices 712 and 714 are shown as being included in a common physical module. A number of STA devices 720, 722, 724, 726, 728, and 730 are within cells 716 and 718. As shown, STA device 720 is within not only cells 716 and 718, but also 706 and 708.

According one embodiment of the invention, load balancing can occur amongst AP devices found in separate physical modules. In one scenario, STA device 710 is associated with AP device 702, and STA devices 720, 722, 724, 726, 728, and 730 are associated with AP device 712. Here, the network has uneven load in the sense that only one STA device is associated with AP device 702, while many more STA devices are associated with AP device 712. In the present embodiment, the association of STA device 720 may be changed to achieve better load balancing. Specifically, STA device 720 may instead associate with AP device 702, which shifts load from a more heavily loaded AP device to a less heavily loaded device.

According to another embodiment of the invention, load balancing can occur amongst AP devices found in the same physical module. In another scenario, STA devices 720, 722, 724, and 726 may be associated with AP device 712, and STA devices 728 and 730 may be associated with AP device 714. Here, the network has uneven load in the sense that fewer STA devices are associated with AP device 714, while many more STA devices are associated with AP device 712. In the present embodiment, the association of STA device 726, for instance, may be changed to achieve better load balancing. Specifically, STA device 726 may instead associate with AP device 714, which shifts load from a more heavily loaded AP device to a less heavily loaded device.

In additional to information on the load of different AP devices, information indicating the signal strength of different AP devices may also be used in selecting an AP device with which an STA device is to associate. Generally speaking, it may be advantageous for an STA device to be associated with an AP device having a stronger signal strength, which may indicate that the AP device is closer in proximity to the STA device. Different measurements of signal strength may include an RSSI measurement, an SIR measurement, and/or others, as mentioned previously. Selection of an AP device with which an STA device is to associate may thus be based on a combination of both data load and signal strength associated with each candidate AP device. Generally speaking, an AP device having a lighter load is favored in the selection. Also, an AP device having more signal strength is favored.

A. Triggers for Load Balancing

In one scenario, the STA device may be a device that has not yet associated with any AP device and is selecting an AP device with which to associate. Thus, during association of an STA device, the selection of which AP device to associate with may take into account factors such as load information and signal strength information corresponding to various AP devices.

In another scenario, the STA device may already be associated with an AP device. Here, conditions relevant to AP device selection may be periodically monitored. For example, load information and signal strength information corresponding to various AP devices available to be associated with the STA device may be monitored. When a predetermined condition is met, a new AP device may be selected based on such information. The STA device may then be disassociated from its current AP device and associated with the newly selected AP device. This may involve a hand off procedure to transfer the STA device from the current AP device to the newly selected AP device, which is known in the art. The rate of how often the predetermined condition is monitored may be set at a default value for each STA device. Also, a default value may be configured for a group of AP devices or a network. The default values may be determined based on performance considerations.

B. Load Balancing Decision by STA Device

According to one embodiment of the invention, an STA device may perform load balancing by selecting an AP device with which to associate, taking into account information such as load and signal strength of various AP devices. For example, an STA may receive load information from various AP devices in its proximity. In addition, for each AP device, the STA device may make one or more signal strength measurements associated with the AP device. The STA device may can then compare the load information and signal strength information of the available AP devices and select the best AP device with which to associate.

C. Load Balancing Decision by AP Device

According to another embodiment of the invention, an AP device may perform load balancing by selecting itself or another AP device as the AP device with which an STA is to associate. For example, an AP device may obtain its own load information and receive load information from other AP devices proximate to the STA device. In addition, the AP device may receive from the STA device signal strength measurements relating to various AP devices. The AP device may then compare the load and/or signal strength information of various AP devices and select the best AP device with which the STA device is to associate.

An illustrative algorithm is described below for balancing load between two AP devices included in a common physical module. Each AP device may implement the algorithm. The algorithm helps an AP device decide whether it should allow association of an STA, or pass the STA off to be associated with the other AP device. Here, this decision takes into account load information of the AP device carrying out the algorithm and load information of the other AP device in the module. The algorithm may refer to the two AP devices included in a common physical structure as two "AP radios." The AP device carrying out the algorithm is referred to as "the AP radio," and the other AP device is referred to as "the mate radio."

The algorithm is represented by a function named "LOAD_BALANCE," which is invoked by an AP device when a STA device attempts to associate with the AP device. The function returns TRUE if the STA device is accepted by the AP device. It returns FALSE if the STA device is not accepted by the AP device. If TRUE is returned, the STA device is associated with the AP device. If FALSE if returned, the STA device is transferred to the other AP device in the common physical structure, with a message confirming that the STA device is to be associated with the other AP device.

Here, the AP device carrying out the algorithm may be configured for one of three types of load balance schemes: client-side, AP-side, and Network-side. Specifically, a field referred to as "LOAD_BALANCE_TYPE" may be set to one of three values "CLIENT_SIDE," "AP_SIDE," and "NETWORK_SIDE." Client-side refers to a mode in which the STA device makes the load balancing decision as to which AP device it should associate with, as discussed in a previous section. AP-side refers to a mode in which an AP device makes the load balancing, as discussed in the present section. Network-side refers to a mode in which a network entity makes the load balancing decision, as discussed in a later section.

The AP device carrying out the algorithm has access to load information for each AP device included in the common physical module. The load information comprises (1) a count of number of STAs associated with the AP device and (2) a measure of channel utilization expressed as a percentage of time spent by the AP device in communicating data.

If the load balance type is client-side, the function returns TRUE to allow the STA device to associate with the present AP device. This is done because in such a mode the STA station would be selecting the appropriate AP device with which to associate, and the present AP device allows the STA device to make the association.

If an association type field indicates that the STA device has already been transferred over from the other AP device in the common physical module, the present AP device also allows the association. In this case, the other AP device likely has carried out the same algorithm and determined that the present AP device should be selected for association with the STA device. Thus, the present AP device allows the association.

If the load type is AP-side, the function returns either TRUE or FALSE depending on load information of the present AP device and the other AP device. Generally speaking, the less heavily loaded AP device is chosen for association with the STA device. Here, if the number of STA devices associated with the present AP exceed the number of STA devices associated with the other AP device by a certain value, for example "2", then the function returns FALSE. Or, if the percentage of time spent by the present AP device in communicating data exceeds the percentage of time spent by the other AP device in communicating data by a certain value, for example "10%", then the function also returns FALSE. Otherwise, the function returns TRUE. In other words, if by either measure the present AP device is more heavily loaded than the other AP device, the STA device is passed off to the other AP device for association. Otherwise, the present AP device associates with the STA device.

Finally, if the load type is network-side, the function returns TRUE to allow the STA device to associate with the present AP device. Here, a network entity may manage the manner by which load is balanced, and an algorithm such as the one described above allows that to occur.

D. Load Balancing Decision by Network Entity

In another embodiment of the invention, a central entity other than the available AP devices may perform load balancing by selecting the AP device with which an STA is to associate. The central entity may also be referred to as a network entity and may reside on a network connected to one or more AP devices. The central entity may select the appropriate AP device for association based on information collected for a large number of AP devices, taking into account load distribution across one or more wireless networks.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for establishing communications in a wireless local area network comprising:
    identifying one or more frequency channels from a plurality of frequency channels, wherein the one or more frequency channels are identified that have a least number of access point (AP) devices operating on the frequency channel;
    obtaining at least one channel-specific measurement for each of the one or more frequency channels, wherein the at least one channel specific measurement includes a proximity factor each AP device on each of the one or more frequency channels, wherein the proximity factor provides an estimate of distance of the AP device to a present AP device;
    for each of the one or more frequency channels, identifying an AP device that has the proximity factor with an estimated distance indicating that the AP device is the closest to the present access point (AP) out of all of the AP devices on the frequency channel;
    determining which AP device of the identified AP devices is the furthest away from the present AP device based upon the estimated distance indicated by the proximity factor;
    automatically selecting a frequency channel from the one or more frequency channels by taking into account the at least one channel-specific measurement for each of the one or more frequency channels, wherein the frequency channel is selected that has the identified AP device that is determined to be the furthest away from the present AP device; and
    configuring the present AP device to transmit and receive data on the selected frequency channel, wherein the present AP device communicates data with a present station (STA) device within a wireless local area network.

2. The method of claim 1 wherein the at least one channel-specific measurement for each of the one or more frequency channels comprises a measurement of signal strength on the frequency channel.

3. The method of claim 2 wherein the measurement of signal strength is based on a received signal strength indicator (RSSI) measurement.

4. The method of claim 2 wherein the measurement of signal strength is based on a signal-to-interference ration (SIR) measurement.

5. The method of claim 2 wherein the measurement of signal strength is based on a measure of general signal strength on the frequency channel.

6. The method of claim 2 wherein the measurement of signal strength is based on a measure of signal strength associated with a specific AP device operating on the frequency channel.

7. The method of claim 6 wherein the measure of signal strength associated with a specific AP device is obtained by sending a probe request to the specific AP device and measuring signal strength on the frequency channel as the specific AP device sends a probe response corresponding to the probe request.

8. The method of claim 1 wherein the at least one channel-specific measurement for each of the one or more frequency channels comprises a measurement of data load on the frequency channel.

9. The method of claim 8 wherein the measurement of data load is based on a percentage of time during which an AP device is communicating data on the frequency channel.

10. The method of claim 1 wherein the at least one channel-specific measurement for each frequency channel comprises a composite measure that takes into account, for each of a plurality of AP devices operating on the frequency channel, a measurement of signal strength associated with the AP device and a measurement of data load associated with the AP device.

11. The method of claim 1 wherein automatic selection of the frequency channel is triggered during initialization of the wireless local area network.

12. The method of claim 1 wherein automatic selection of the frequency channel is triggered during expansion of the wireless local area network.

13. The method of claim 1 wherein automatic selection of the frequency channel is triggered when a predetermined condition is met.

14. The method of claim 1 wherein the predetermined condition is met if a packet error rate (PER) associated with the present AP device exceeds a threshold.

15. The method of claim 1 wherein the step of automatically selecting the frequency channel is performed by the present AP device.

16. The method of claim 1 wherein automatic selection of the frequency channel is triggered by a central entity.

17. The method of claim 16 wherein the central entity receives information related to the at least one channel-specific measurement and selects at least one AP device to perform automatic selection of the frequency channel.

18. The method of claim 1,
wherein the present AP device and a second AP device are included in a common physical module;
wherein the present AP device performs automatic selection of the frequency channel and communicates with a plurality of STA devices configured to transmit and receive data on the selected frequency channel, wherein the plurality of STA devices are able to dynamically change operating frequency; and
wherein the second AP device operates on a pre-selected frequency channel and communicates with a separate plurality of STAs configured to transmit and receive data on the pre-selected frequency channel, wherein the separate plurality of STA devices are not able to dynamically change operating frequency.

19. A system for establishing communications in a wireless local area network comprising:
means for obtaining at least one channel-specific measurement for each of a plurality of frequency channels;
means for automatically selecting one of the plurality of frequency channels as a selected frequency channel by taking into account the at least one channel-specific measurement for each of the plurality of frequency channels, wherein the channel specific measurement includes a channel quality factor, wherein the channel quality factor is a summation of a contribution channel quality factor determined for each AP device on the frequency channel, the contribution channel quality factor for an AP device is based on load factor for the AP device weighted by a proximity factor for the AP device, a frequency channel with the lowest channel quality factor is the selected frequency channel, wherein the proximity factor indicates distance of the AP device to a present AP device, the load factor indicates the contribution of the AP device to load on the frequency channel associated with the AP device; and
means for configuring the present access point (AP) device to transmit and receive data on the selected frequency channel, wherein the present AP device communicates data with a present station (STA) device within a wireless local area network.

20. A method for establishing communications in a wireless local area network comprising:
obtaining at least one channel-specific measurement for one or more access point (AP) devices for each of a plurality of frequency channels, wherein the channel specific measurement includes a channel quality factor for each frequency channel, wherein the channel quality factor for a frequency channel is a summation of a contribution channel quality factor determined for each AP device on the frequency channel, the contribution channel quality factor for an AP device is based on load factor for the AP device weighted by a proximity factor for the AP device, wherein the proximity factor provide a measure of distance of the AP device to a present AP device, the load factor indicates the contribution of the AP device to load on the frequency channel associated with the AP device;
automatically selecting one of a plurality AP devices on a frequency channel with a lowest channel quality factor, wherein automatic selection of one of the plurality of AP devices is triggered during an initialization of a present station (STA) device;
configuring the present STA device to transmit and receive data on the frequency channel with the lowest channel quality factor upon which the selected one of the plurality of AP device is operating, wherein the present STA device is configured to communicates data with the selected access point (AP) device within a wireless local area network.

21. The method of claim 20, wherein the automatic selection of the one of the plurality of AP devices further comprises:
determining a signal strength for each of the plurality of AP devices; and selecting an AP device from the plurality of AP devices, wherein AP device selected has a highest signal strength of the plurality of AP devices.

22. The method of claim 20, wherein the automatic selection of the one of the plurality of AP devices further comprises:
determining an operating load of each of the plurality of the AP devices; and selecting an AP device from the plurality of AP devices, wherein the AP device selected has a lowest operating load of each of the plurality of AP devices.

23. The method of claim 22, wherein the step of determining an operating load of the plurality of AP devices includes:
determining a channel utilization of a frequency channel for each of the plurality of AP devices.

24. The method of claim 23, wherein the step of determining a channel utilization of a frequency channel for each of a plurality of AP devices further comprises:
for each AP device on each frequency channel, determining a percentage of time that the AP device is communicating data.

25. The method of claim 20, further comprising:
receiving a request from an AP device to obtaining at least one channel-specific measurement for a frequency channel;
obtaining the at least one channel-specific measurement for the frequency channel in response to the request; and
transmitting the at least one channel-specific measurement for the frequency channel to the AP device.

26. The method of claim 20, further comprising:
receiving a request to migrate to an other frequency channel from an AP device; configuring the present STA device to transmit and receive data on the other frequency channel in response to the request to migrate.

* * * * *